US009036936B2

(12) United States Patent
Tsukagoshi et al.

(10) Patent No.: US 9,036,936 B2
(45) Date of Patent: May 19, 2015

(54) IMAGE PROCESSING DEVICE, IMAGE PROCESSING METHOD, AND IMAGE PROCESSING PROGRAM

(75) Inventors: Kazuma Tsukagoshi, Tokyo (JP); Kei Yamaji, Tokyo (JP); Tetsuya Matsumoto, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 70 days.

(21) Appl. No.: 13/478,501

(22) Filed: May 23, 2012

(65) Prior Publication Data

US 2012/0321211 A1 Dec. 20, 2012

(30) Foreign Application Priority Data

Jun. 20, 2011 (JP) ................................ 2011-136691
Jun. 29, 2011 (JP) ................................ 2011-144306

(51) Int. Cl.
 G06K 9/40 (2006.01)
 H04N 5/232 (2006.01)
 G06T 7/00 (2006.01)

(52) U.S. Cl.
 CPC .......... *H04N 5/23254* (2013.01); *G06T 7/0002* (2013.01); *G06T 2207/20021* (2013.01); *G06T 2207/30168* (2013.01)

(58) Field of Classification Search
 None
 See application file for complete search history.

(56) References Cited

U.S. PATENT DOCUMENTS

| 5,621,495 | A  | * | 4/1997 | Yamamoto et al. ............. 396/89 |
| 7,720,302 | B2 |   | 5/2010 | Aoyama |
| 2004/0217257 | A1 | * | 11/2004 | Fiete et al. .................. 250/201.7 |
| 2006/0153471 | A1 | * | 7/2006 | Lim et al. ...................... 382/255 |
| 2006/0153472 | A1 | * | 7/2006 | Sakata et al. .................. 382/255 |
| 2008/0144956 | A1 | * | 6/2008 | Meisner et al. ................ 382/255 |
| 2009/0109320 | A1 | * | 4/2009 | Oi .................................. 348/345 |
| 2010/0165122 | A1 | * | 7/2010 | Castorina et al. .......... 348/208.4 |
| 2011/0299793 | A1 | * | 12/2011 | Miura et al. ................... 382/275 |

FOREIGN PATENT DOCUMENTS

| JP | 2005-122688 | 5/2005 |
| JP | 2005-182745 | 7/2005 |
| JP | 3797346 | 4/2006 |
| JP | 2006-217472 | 8/2006 |

OTHER PUBLICATIONS

Liu, S., Chia, L., and Rajan, D., Attention Region Selection with Information from Professional Digital Camera, Nov. 6-11, 2005, MM'05, pp. 391-394.*

(Continued)

*Primary Examiner* — Stephen R Koziol
*Assistant Examiner* — Jonathan S Lee
(74) *Attorney, Agent, or Firm* — Young & Thompson

(57) ABSTRACT

An image processing device includes an image acquirer for acquiring an image, a depth of field calculator for calculating an estimate representing a depth of field of an image based on collateral information of the image, an image divider for dividing the image into evaluation regions, and a blur evaluator for detecting a blur in each of the evaluation regions divided by the image divider, performing blur evaluation for calculating evaluation values for evaluating degrees of an out-of-focus blur or a camera/subject movement-caused blur, and calculating an evaluation value of the image from the evaluation values of the evaluation regions based on the estimated depth of field.

22 Claims, 13 Drawing Sheets

(56) References Cited

OTHER PUBLICATIONS

Japanese Official Action—2011-136691—May 14, 2013.
Chinese Office Action, dated Oct. 11, 2014, in corresponding Chinese Patent Application No. 201210177069.2.
Chinese Office Action dated Mar. 24, 2014 in corresponding Chinese Patent Application No. 201210177069.2 with English translation of Chinese Office Action.

* cited by examiner

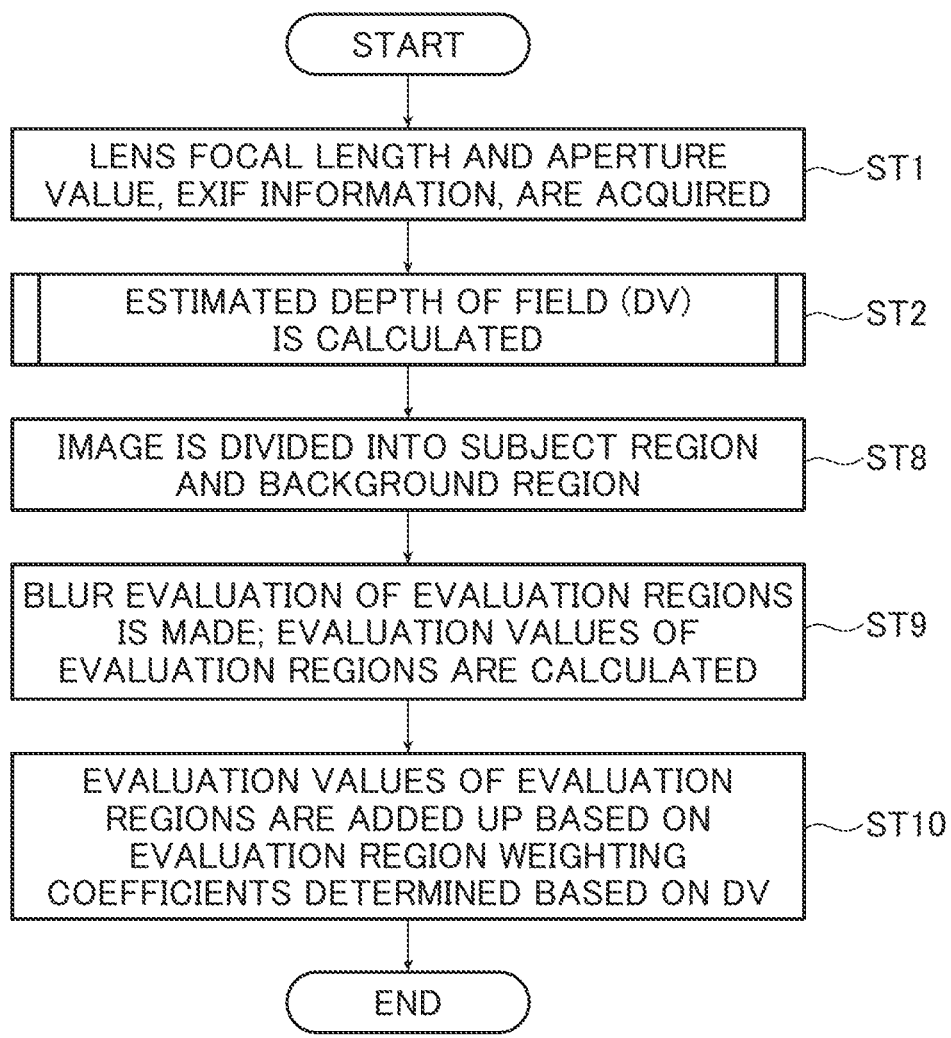

FIG.15A
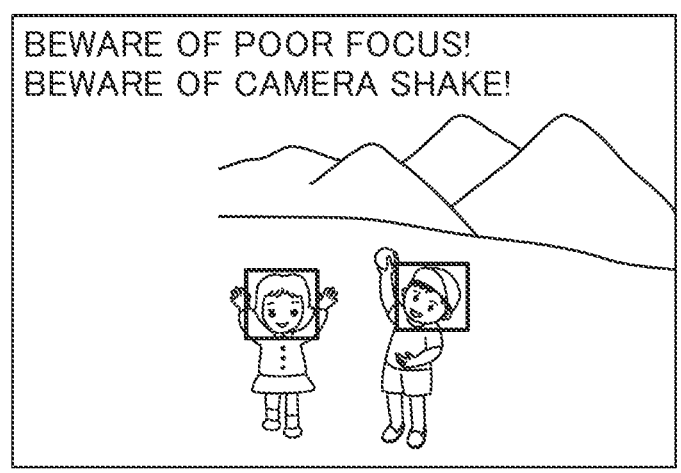
FIG.15B     FIG.15C
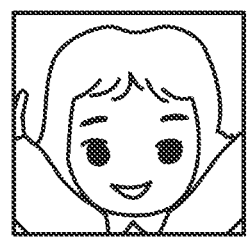   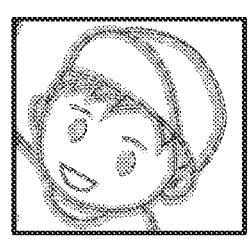

IMAGE PROCESSING DEVICE, IMAGE PROCESSING METHOD, AND IMAGE PROCESSING PROGRAM

BACKGROUND OF THE INVENTION

The present invention relates to image processing device, image processing method, and image processing program that judges whether an image containing a camera/subject movement-caused blur and/or an out-of-focus blur (which may be hereinafter referred to simply as blur) is a successful image of which the blur is intentionally caused by a user (photographer) or a failed image.

There are cases where the user may desire to preferentially select a successful image containing no blur from among a large number of images shot with a digital camera or other like imaging device. However, since some images contain a blur that is intentionally caused by the user and, therefore, the user had difficulty judging whether an image containing a blur is a successful image where the blur is intentionally caused by the user or a failed image (blurred image).

In this regard, JP 2006-217472 A describes an image producing method for imaging a subject to produce image data, judging, based on the shooting conditions used at the time of shooting, whether the image data contain a blur due to camera/subject movement that may have occurred at the time of shooting, and storing the judgment result information in association with the image data. JP 2006-217472 A also describes correcting a movement-caused blur contained in blurred image data based on movement-caused blur information when the image data are blurred image data.

JP 3797346 B describes an image processing device for effecting a higher sharpness adjustment when the aperture value acquired from aperture value information is manually set by a user and not smaller than a given value than when the aperture value is set under standard shooting conditions, wherein the device judges whether an image adjustment for adjusting the sharpness of image data according to operation mode information and, when judgment is made to effect the image adjustment, determines the degree of the sharpness adjustment based on aperture value information and lens focal length information.

JP 2005-122688 A describes an image processing method of judging whether a digital photograph image has a small depth of field, sets parameters for correcting an out-of-focus blur using an image representing a major subject region of a digital photograph image judged to have a small depth of field, setting parameters for correcting the blur using the whole region of the digital photograph image other than the major subject region, and using these set parameters to correct the bout-of-focus blur in said digital photograph image.

SUMMARY OF THE INVENTION

According to the method described in JP 2006-217472 A, in order to judge after shooting whether the image data of an acquired image is blurred image data containing a movement-caused blur, judgment needs to be previously made at the time of shooting as to whether the image may contain a movement-caused blur, and the judgment result information needs to be stored in association with the image data. Further, the method described in JP 2006-217472 A is incapable of judging whether an image is a successful image containing a blur intentionally caused by the user or a failed image.

The device described in JP 3797346 B requires the operation mode information for judging whether to effect an image adjustment for adjusting the sharpness of image data. The device described in JP 3797346 B makes a sharpness adjustment but does not make judgment as to a blur in an image and is hence incapable of judging whether an image is a successful image containing a blur intentionally caused by the user or a failed image.

The method described in JP 2005-122688 A corrects an out-of-focus blur in a digital photograph image having a small depth of field and does not judge whether an image is a successful image containing a blur intentionally caused by the user or a failed image.

A number of viewers may find an image attractive where only the subject is in focus while the foreground and/or background is out of focus. Depending on the lens used, moreover, acquiring an image with the whole area in focus is difficult in the first place. If only the pixel information of an image is used to detect a blur in such an image in evaluation of the image, a blur intentionally caused by the user and a blur necessarily resulting from the use of some kinds of lenses may also result in poor rating of the images, failing to provide evaluations expected by the user.

An object of the present invention is to provide an image processing device, an image processing method, and an image processing program for correctly judging whether an image containing a blur is a successful image where the blur is intentionally caused by a user or a failed image.

In order to achieve the above object, the first aspect of the present invention provides an image processing device comprising:

an image acquirer for acquiring an image;

a depth of field calculator for calculating an estimate representing a depth of field of the image based on collateral information of the image acquired by the image acquirer, an image divider for dividing the image into evaluation regions, and a blur evaluator for detecting an out-of-focus blur or a movement-caused blur in each of the evaluation regions divided by the image divider, performing blur evaluation for calculating evaluation values for evaluating degrees of the out-of-focus blur or the movement-caused blur, and calculating an evaluation value of the image from the evaluation values of the evaluation regions based on the estimated depth of field.

Also, the second aspect of the present invention provides an image processing method comprising:

an image acquiring step of acquiring an image;

a depth of field calculating step of calculating an estimate representing a depth of field of the image based on collateral information of the image acquired in the image acquiring step;

an image dividing step of dividing the image into evaluation regions; and a blur evaluating step of detecting an out-of-focus blur or a movement-caused blur in each of the evaluation regions divided in the image dividing step to perform blur evaluation for calculating evaluation values for evaluating a degree of the out-of-focus blur or the movement-caused blur and calculating an evaluation value of the image from the evaluation values of the evaluation regions based on the estimated depth of field.

Also, the third aspect of the present invention provides a computer readable recording medium having recorded thereon an image processing program for causing a computer to execute each step of the second aspect of the image processing method.

Also, the fourth aspect of the present invention provides an image processing device comprising an image acquirer for acquiring an image, a depth of field calculator for calculating an estimate representing a depth of field of the image based on collateral information of the image acquired by the image acquirer, a depth of field judging unit for judging whether the depth of field of the image is smaller or greater than a reference depth based on an estimated depth of field calculated by the depth of field calculator, and a blur evaluator that, when the depth of field judging unit judges the depth of field of the image to be smaller than the reference depth, performs one of following processings:
(A) no blur evaluation for detecting an out-of-focus blur or a movement-caused blur in the image and calculating an evaluation value for evaluating a degree of the out-of-focus blur or the movement-caused blur in the image,
(B) the blur evaluation for a specific region extracted from the image and calculation of the evaluation value of the image from an evaluation value of the specific region, and
(C) reception of an evaluation value entered by a user.

Also, the fifth aspect of the present invention provides an image processing method comprising:

an image acquiring step of acquiring an image;

a depth of field calculating step of calculating an estimate representing a depth of field of the image based on collateral information of the image acquired in the image acquiring step;

a depth of field judging step of judging whether the depth of field of the image is smaller or greater than a reference depth based on an estimated depth of field calculated in the depth of field calculating step; and a blur evaluating step of performing one of following processings when the depth of field of the image is judged to be smaller than a reference depth in the depth of field judging step:
(A) no blur evaluation for detecting an out-of-focus blur or a movement-caused blur in the image and calculating an evaluation value for evaluating a degree of the out-of-focus blur or the movement-caused blur in the image,
(B) the blur evaluation for a specific region extracted from the image and calculation of an evaluation value of the image from an evaluation value of the specific region, and
(C) reception of an evaluation value entered by a user.

Also, the sixth aspect of the present invention provides a computer readable recording medium having recorded thereon an image processing program for causing a computer to execute each step of the fifth aspect of the image processing method.

The present invention, using collateral information on an image, enables correct judgment as to whether the image containing a blur is a successful image where the blur is intentionally caused by a user or a failed image. Further, the present invention enables evaluation of images considering the user's intention, the individual states of the images, major features in the images such as region representing the subject, by dividing each image into evaluation regions and calculating evaluation values of the individual evaluation regions based on an estimated depth of field using different standards for different images.

BRIEF DESCRIPTION OF THE DRAWINGS

FIG. 6 is a flowchart of a second embodiment representing the operation of the image processing device shown in FIG. 1.

FIG. 15A illustrates an example of image; FIG. 15B illustrates a subject's face region, not blurred; and FIG. 15C illustrates a subject's face region, blurred.

DETAILED DESCRIPTION OF THE INVENTION

The image processing device, image processing method and image processing program of the invention are described below in detail with reference to preferred embodiments shown in the accompanying drawings.

Figure 1:
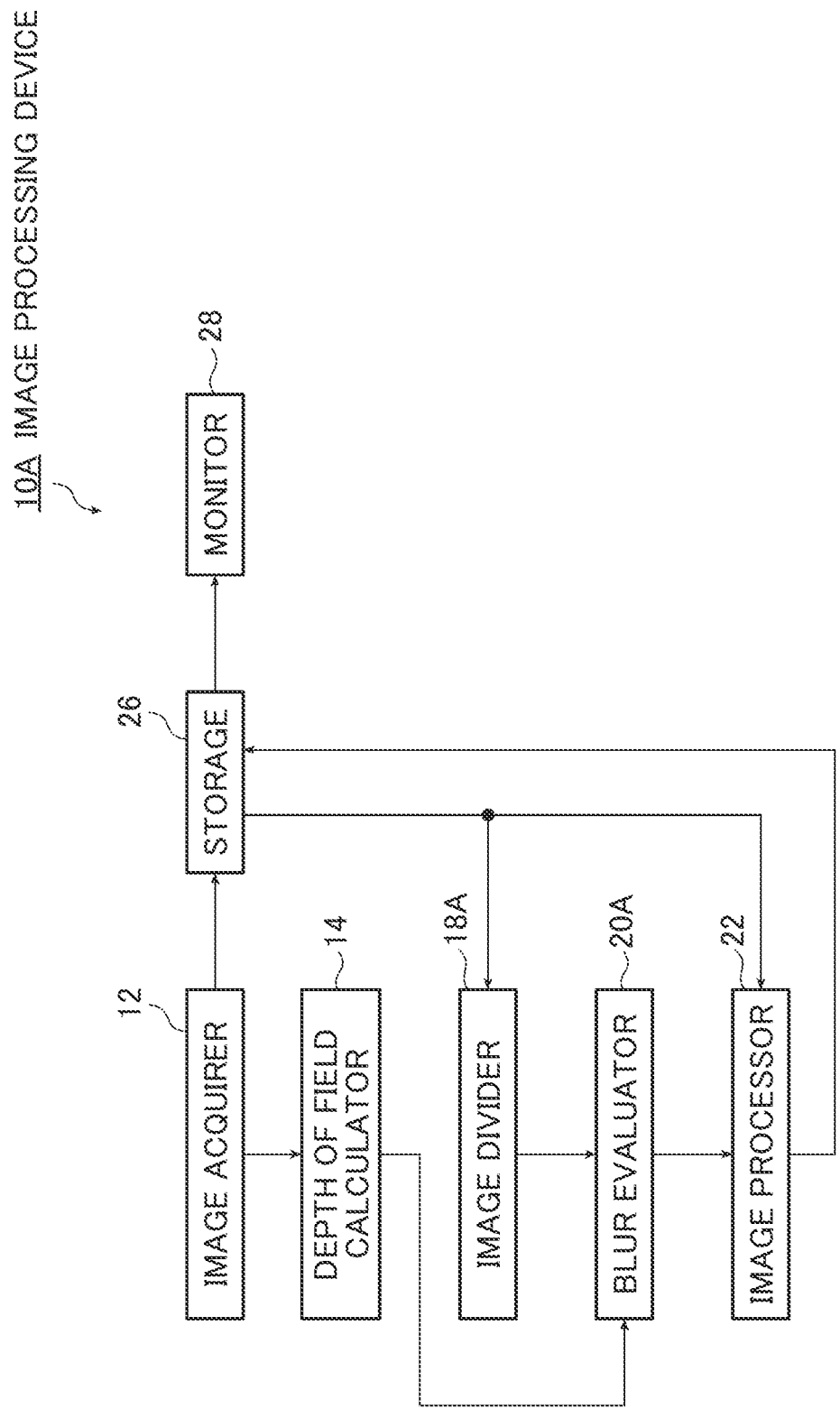
FIG. 1 is a block diagram illustrating the concept of a configuration of an embodiment of the image processing device according to a first aspect of the invention.

FIG. 1 is a block diagram illustrating the concept of a configuration of an embodiment of an image processing device according to a first aspect of the invention. An image processing device 10A shown in that drawing judges whether an image containing a blur is a successful image where the blur is intentionally caused by a user or a failed image and comprises an image acquirer 12, a depth of field calculator 14, an image divider 18A, a blur evaluator 20A, an image processor 22, a storage 26, and a monitor 28.

The image acquirer 12 acquires an image (image data) for which blur evaluation is to be made. The image acquirer 12 is not specifically limited, provided that it is capable of acquiring images and may acquire an image through, for example, a network including a USB (universal serial bus) memory, a memory card, an optical disk, or a wired/wireless network. An image acquired by the image acquirer 12 is stored in the storage 26.

The depth of field calculator 14 calculates an estimate DV representing the depth of field of an image based on collateral information of the image acquired by the image acquirer 12.

The collateral information of an image herein contains various information including, for example, lens' focal length, aperture value (f-number), distance between camera and subject (shooting distance), and shutter speed. The collateral information may be a file separate from the corresponding image, provided that the collateral information is associated with that image. Alternatively, when an image shot with, for example, a digital camera is recorded in an image file format such as Exif (Exchangeable Image File Format), various information described above is recorded as header information (Exif information) collateral to the data of the shot image.

The depth of field calculator 14 uses the lens' focal length and aperture value (f-number) as collateral information of an image to calculate the estimated depth of field DV using a formula (1) below. As the estimated depth of field DV decreases, the depth of field increases; as DV increases, the depth of field decreases.

$$\text{Estimated depth of field DV=lens' focal length/aperture value} \qquad (1)$$

With a great depth of field, the whole area is substantially in focus in almost any scene, and since the degree of out-of-focus blur in the background is small, a blur observed in an image was likely caused by subject/camera movement or poor focusing. When the depth of field is small, on the other hand, the well-focused range decreases and, therefore, a blur detected in an image is likely a blur intentionally caused by the user using a shooting mode for defocusing the background.

The estimated depth of field DV is not specifically limited to one calculated with the above formula (1); the aperture value itself, for example, may be used as the estimated depth of field DV. As the aperture value decreases, the depth of field decreases. The estimated depth of field DV may be adjusted using the shooting distance. As the shooting distance decreases, the depth of field decreases. Considering this, an adjustment may be made so that the estimated depth of field DV increases as the shooting distance decreases.

However, the estimated depth of field DV can be more accurately calculated with the formula (1) using the lens' focal length and the aperture value than using the aperture value itself. Further, when the aperture value itself is used as the estimated depth of field DV, and also when the calculation is made with the formula (1) using the lens' focal length and the aperture value, adjustment of the estimated depth of field DV using the shooting distance enables still more accurate calculation.

Next, the image divider 18A divides the image acquired by the image acquirer 12 into evaluation regions. According to a first embodiment described later, the image divider 18A divides the image into a subject region and one or more regions other than the subject region. According to a second embodiment described later, the image divider 18A divides the image into a plurality of regions such as 4, 9, and 16 regions.

When the subject in the subject region extracted from the image may be a person or other objects than a person including, for example, animal, plant, automobile, and building.

The blur evaluator 20A detects a blur in each of the evaluation regions into which the image is divided by the image divider 18A, performs blur evaluation to calculate estimates used to evaluate the degrees of the blurs, and calculates an evaluation value of the image from the evaluation values of the individual evaluation regions based on the estimated depth of field DV using different standards for different images, the standards being the number of allowable blurred regions RV in the first embodiment and weighting coefficients in the second embodiment.

According to the first embodiment, the blur evaluator 20A determines the number of allowable blurred regions RV representing a maximum allowable number of evaluation regions judged to be blurred regions or failed regions, with which the image is still not judged to be a blurred image (failed image) based on the estimated depth of field DV, performs blur evaluation of the individual evaluation regions to calculate estimates thereof, and adds up the evaluation values of a number of evaluation regions equal to "the total number of evaluation regions minus the number of allowable blurred regions RV" to obtain the average thereof, the evaluation regions for such addition being selected in order of decreasing evaluation values, thereby calculating the evaluation value of the image.

According to the second embodiment, The blur evaluator performs blur evaluation to calculate the evaluation values of the subject region and one or more other regions into which the image is divided by the image divider and performs weighted addition of the evaluation values of the subject region and one or more other regions based on the estimated depth of field DV to calculate the evaluation value of the image.

The evaluation value is determined according to the degree of blur in the image (region). According to this embodiment, the evaluation value is in a range of 0 to 1. The evaluation value is close to 0 when the degree of blur is relatively large and close to 1 when the degree of blur is relatively small.

As the aperture value decreases, the depth of field decreases. As the aperture value decreases, the range in which the image appears acceptably sharp decreases, so that the blur evaluator 20A gives a smaller evaluation value. Accordingly, adjustment is preferably made to increase the evaluation value as the aperture value decreases.

The blur evaluator 20A judges whether the image (region) is a blurred image (blurred region) based on the evaluation value. The blur evaluator 20A judges the image to be a blurred image when the evaluation value is smaller than a given reference value, for example, 0.3.

The method of detecting a blur in the image and the method of calculating the evaluation value for evaluating the degree of blur in the image are not limited in any way, provided that the degree of blur in the image can be evaluated. For example, the blur evaluation may be made not by detecting a blur in the image but by detecting the sharpness of the image and evaluating the degree of sharpness of the image.

Next, the image processor 22 arranges a plurality of images in ascending or descending order according to the evaluation value. This assists the user in evaluating a blur in images, helping the user preferentially select desirable images containing no blur or fewer blurs.

When the blur evaluator 20A judges the image to be a blurred image, the image processor 22 performs correction for reducing the blur in the image. The method of correcting the blur in the image is not limited in any manner and may be any known method such as one for performing image sharpness processing. For example, use may be made of a method whereby the image is divided into high, middle, and low frequency components, and the middle frequency component is suppressed while the high frequency component is enhanced thereby to reduce the blur in the image.

The storage 26 may be a storage device such as a hard disk and stores images acquired by the image acquirer 12. The image acquired by the image acquirer 12 is first stored in the storage 26, which supplies the image to, for example, the image divider 18A and the image processor 22. The storage 26 also stores images having undergone correction for reducing the blur by the image processor 22. The image stored in the storage 26 is displayed on the monitor 28.

The monitor 28 may be, for example, a liquid crystal display and displays, for example, images stored in the storage 26, i.e., images acquired by the image acquirer 12, images having undergone correction for reducing the blur by the image processor 22.

Figure 2:
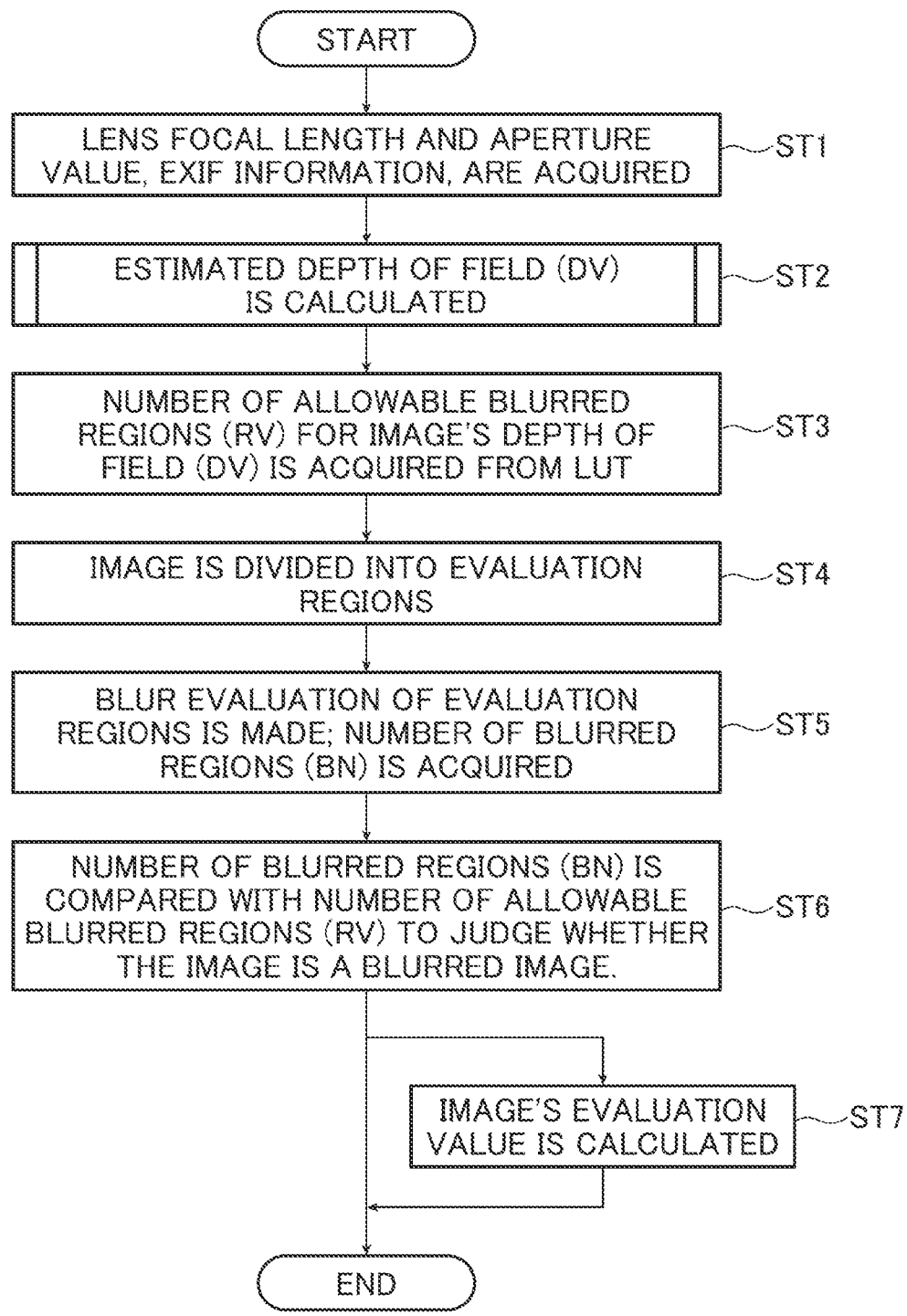
FIG. 2 is a flowchart of the first embodiment representing the operation of the image processing device shown in FIG. 1.

Next, the operation of the first embodiment of the image processing device 10A where the image is evaluated by the image processing method according to a second aspect of the invention is described with reference to the flowchart illustrated in FIG. 2.

In the image processing device 10A, the image acquirer 12 first acquires an image for blur evaluation. When, for example, an image in the image file format of Exif is acquired, the lens focal length and aperture value are obtained as collateral information to the image from the header information (Exif information) in step ST1. The image acquired by the image acquirer 12 is stored in the storage 26, and the collateral information to the image is supplied to the depth of field calculator 14.

Then, the depth of field calculator 14 uses the lens focal length and aperture value, which are collateral information to the image acquired by the image acquirer 12, to calculate the estimated depth of field DV of the image using the above formula (1) in step ST2.

Next, the blur evaluator 20A determines the number of allowable blurred regions RV based on the estimated depth of field DV in step ST3.

For example, an LUT (lookup table) representing the relation between depth of field and number of allowable blurred regions RV may be used to obtain the number of allowable blurred regions RV corresponding to the estimated depth of field DV. The LUT has previously defined therein the ratio of the number of allowable blurred regions depending on the depth of field to the total number of the evaluation regions based on the relation, statistically obtained, between the depth in focus that varies with the depth of field and the range where the image appears in focus.

Figures 3, 4:
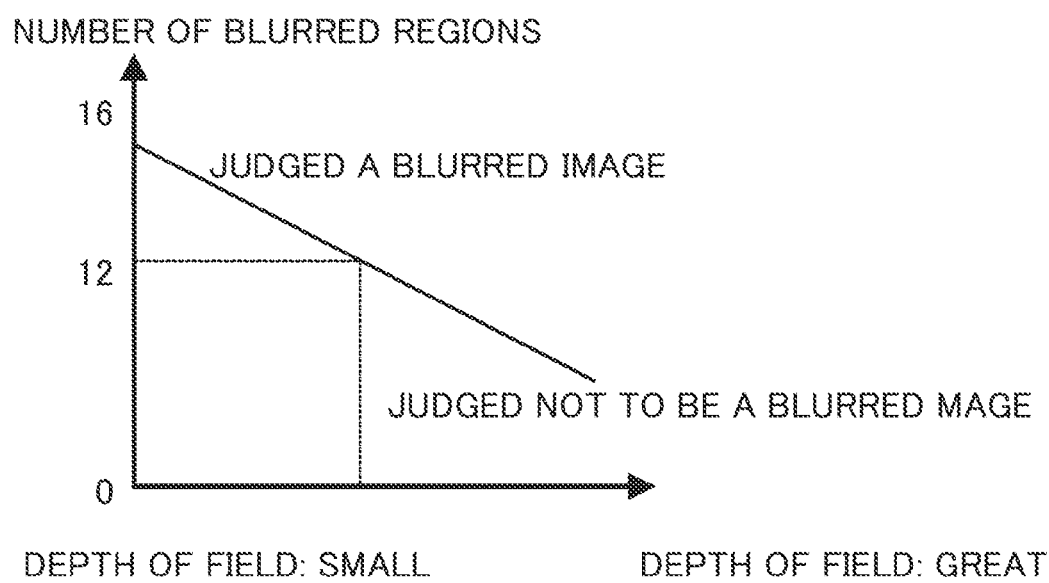
FIG. 3 is an example of 16 divided evaluation regions of an image.
FIG. 4 is an example of graph illustrating a relation between depth of field and blurred image.

FIG. 4 is a graph of illustrating an example of a relation between depth of field and blurred image. The drawing shows depth of field on the horizontal axis and the number of blurred regions BN on the vertical axis. In the example illustrated in that graph, as the depth of field decreases, the number of allowable blurred regions RV, i.e., the maximum allowable number of evaluation regions judged to be blurred regions with which the image is still not judged to be a blurred image, increases; conversely, as the depth of field increases, the number of allowable blurred regions RV decreases.

Supposing that the LUT defines the relation between depth of field and number of allowable blurred regions RV as illustrated in the graph, when, for example, 12 or more evaluation regions of an image are blurred regions out of 16 evaluation regions as evaluated based on the estimated depth of field DV, then the image is judged to be a blurred image; when the number of blurred regions BN is 11 or smaller, the image is judged not to be a blurred image. In this case, the number of allowable blurred regions RV is 11.

Next, the image divider 18A divides the image into a plurality of regions such as 4, 9, and 16 regions in step ST4, and the blur evaluator 20A performs the blur evaluation of the individual regions to calculate their evaluation values in step ST5. Here, as illustrated in FIG. 3, the image is divided into four horizontal rows A to D and four vertical columns 1 to 4, or into a total of 16 divisions, and the blur evaluation is performed on the individual evaluation regions.

Judgment is then made as to whether each of these evaluation regions is a blurred region based on each of the evaluation values to obtain the number of blurred regions BN in step ST5. When the evaluation value of a region is smaller than 0.3, for example, the region is judged to be a blurred region.

Figures 5A, 5B:
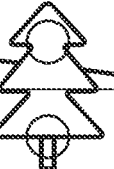
FIGS. 5A and 5B illustrate examples of successful and failed images.

Next, the number of blurred regions BN is compared with the number of allowable blurred regions RV in step ST6. When the number of blurred regions BN is smaller than the number of allowable blurred regions RV say, for example, 11 as illustrated in FIG. 5A, in which the evaluation regions indicated by "BLUR" are blurred regions and the evaluation regions indicated by "O" are successful regions, the image is judged to be a successful image without blur, whereas when the number BN is larger than the number RV, that is, when, for example, all the 16 evaluation regions are blurred regions as illustrated in FIG. 5B, the image is judged to be a blurred image in step ST6.

Apart from blur evaluation of the image, the evaluation values of a number of evaluation regions equal to "the total number of evaluation regions minus the number of allowable blurred regions RV" are added up, and the average thereof is obtained, the evaluation regions for such addition being selected in order of decreasing evaluation values from the greatest evaluation value (best evaluation value), to calculate the evaluation value of the image in step ST7. In the case illustrated in FIGS. 3 to 5, the evaluation values of 16−11=5 evaluation regions are added up to obtain the average.

Then, the image processor 22 performs correction on the image judged to be a blurred image to reduce the blur. The image after the correction is stored in the storage 26, thereafter the same processing is repeated for a plurality of images. Upon completion of the processing for a given number of images, the image processor 22 arranges the images in descending order of, for example, evaluation value whereupon the images are displayed on the monitor 28.

Alternatively, the image processor 22 may ensure that an indication is displayed to show whether each image is a blurred image based on a threshold BLt. In this embodiment, the threshold BLt is supposed to be smaller than 0.5. When, for example, the evaluation value is smaller than 0.3, an indication is shown that the image is a blurred image.

When evaluation is made of a plurality of images by detecting a blur from information on the image pixels, no distinction can be made between a failed image containing, for example, a camera-movement blur, a subject-movement blur, and an out-of-focus blur and a successful image containing, for example, an out-of-focus blur in the background intentionally caused by the user. Thus, an image with a larger out-of-focus blur in the background is given a lower evaluation irrespective of whether the blur is intentional or not. An out-of-focus blur in the background, however, is often preferred by the user.

According to the present invention, an estimation is made as to whether an image containing an out-of-focus blur in, for example, the background is a successful image where the blur is intentionally caused by the user or a failed image from its collateral information acquired at the time of shooting in order to switch the evaluation method. Thus, a successful image having, for example, a blur in the background that is intentionally caused by the user is saved unfavorable evaluation but instead given an appropriate evaluation, so that the user can be appropriately assisted in preferentially selecting successful images, not blurred images, from among a large number of images.

According to the present invention, the image is divided into regions, and the individual regions are evaluated to determine whether the image is a blurred image. Further, an evaluation value corresponding to the depth of field of the image can be given. Still further, since the evaluation values of the evaluation regions are yielded based on the estimated depth of field DV using different standards for different images (number of allowable blurred regions RV), evaluation considering the user's intention and the states of the individual images is made possible.

Now, the operation of the image processing device 10A according to the second embodiment will be described with reference to the flowchart of FIG. 6.

The steps ST1 to ST2 for calculating the estimated value DV representing the image's depth of field are the same as in the first embodiment.

Next, the image divider 18A divides the image into the subject region and one or more regions other than the subject region in step ST8 to perform blur evaluation of the individual regions, yielding the evaluation values in step ST9.

Figure 7A:
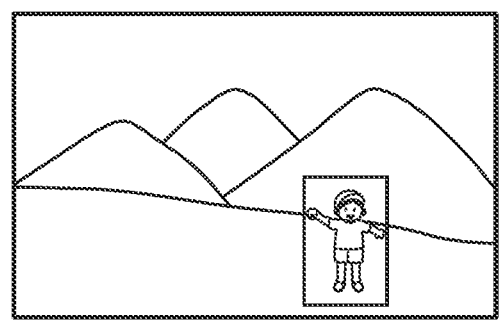
FIG. 7A illustrates an example of image containing a subject.
Figure 7B:
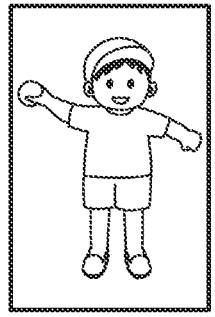
FIG. 7B illustrates a subject region extracted from the image shown in FIG. 7A.
Figure 7C:
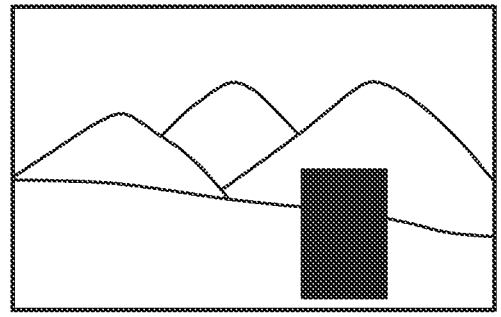
FIG. 7C illustrates the background extracted from the image shown in FIG. 7A.

As illustrated in FIG. 7A, for example, a subject region is extracted from an image containing the subject region, the image is divided into the subject region illustrated in FIG. 7B and the background region other than the subject region as illustrated in FIG. 7C in step ST8 to perform blur evaluation of the individual regions in step ST9. In this case, the evaluation value of the subject region is supposed to be 0.9, and the evaluation value of the background region 0.6.

Figure 8:
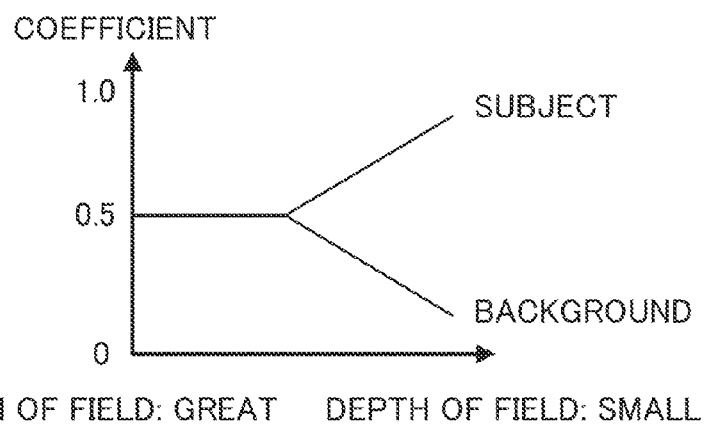
FIG. 8 is a graph illustrating an example of a relation between depth of field and weighting coefficient.

Subsequently, based on the estimated depth of field DV, the evaluation value of the subject region and the evaluation value of the background region are weighted and added up to calculate the evaluation value of the image in step ST10 to judge whether the image is a blurred image based on the evaluation value. As illustrated in FIG. 8, for example, weighting coefficients of the subject region and the background region previously defined according to the depth of field are obtained, whereupon the evaluation values of the subject region and the background region are weighted and combined.

FIG. 8 is an example of graph illustrating a relation between depth of field and weighting coefficient. The graph of FIG. 8 shows depth of field on the horizontal axis and weighting coefficient on the vertical axis. In the graph, with a depth of field greater than a certain degree, the weighting coefficients for the subject region and the background region are equal; with a depth of field smaller than a certain degree, the weighting coefficient for the subject region increases while the weighting coefficient for the background decreases.

Even where the depth of field is judged great, when the depth of field is still relatively small, it is considered likely that the degree of the out-of-focus blur is higher in the background region than in the subject region. Accordingly, the subject region is provided with a greater weight (importance) than the background region as their evaluation values are combined. In the example illustrated in that figure, the evaluation value 0.9 of the subject region is multiplied by a weighting coefficient 0.7, while an evaluation value 0.6 of the background region is multiplied by a weighting coefficient 0.3, and the evaluation values are combined.

On the other hand, when the depth of field is greater than a certain degree, it is considered likely that the degree of the out-of-focus blur decreases in both the subject region and the background region. Thus, since the importance of the subject region and the background region may be considered substantially equal, both regions are given an equal weight for addition of the evaluation values. In the example illustrated in that figure, the evaluation value 0.9 of the subject region and the evaluation value 0.6 of the background region are both multiplied by a weighting coefficient 0.5 before addition.

The graph of FIG. 8 represents a relation between depth of field and weighting coefficient for two regions, subject region and the other region, but the present invention is not limited thereto and may be applied to a case where the image is divided into three or more regions. Where, for example, the image is divided into three regions containing person (major subject region), building, and sky, the weighting coefficients for the building and the sky are reduced according to their distances from the major subject region.

Figure 9A:
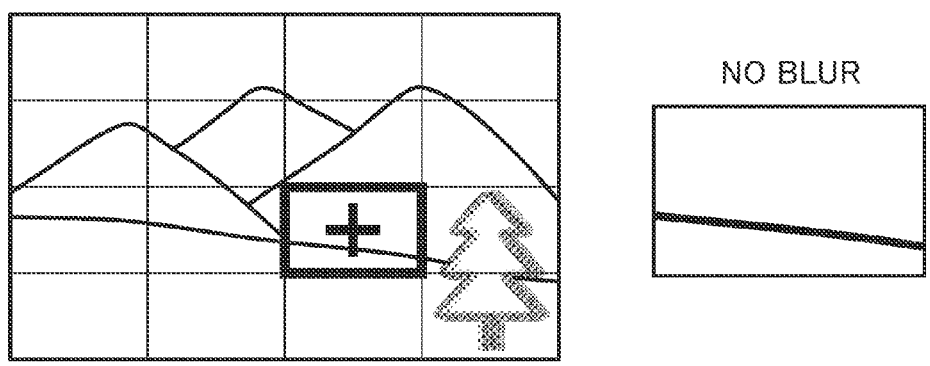
FIGS. 9A and 9B respectively illustrate an image containing no blur and an image containing a blur in a region containing a focusing point.
Figure 9B:
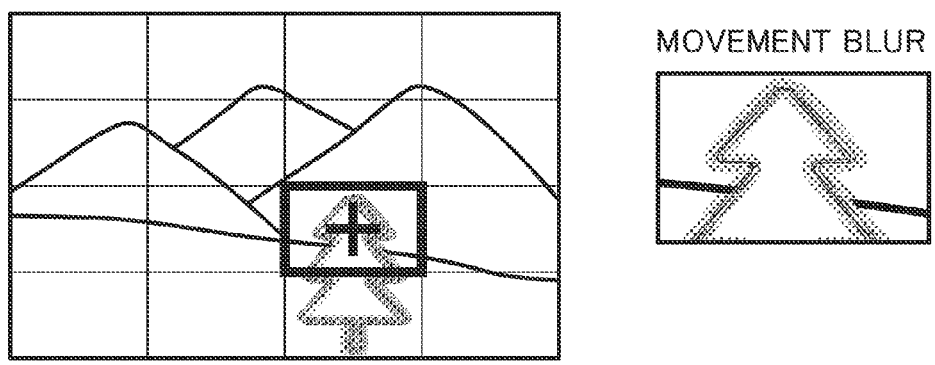

The image divider 18A may detect the subject region from the image in any manner including known methods. For example, image processing such as face detection, human detection, pet detection, and focusing area detection may be used to determine the subject region, or information on focusing points used in autofocus may be employed to determine a region corresponding to a focusing point used for focusing as subject region. Alternatively, the user may select the subject region.

Where the focus is placed on a given region in autofocus, the region indicated by "+" in FIG. 9A, for example, the image is judged to be an image containing no blur when the region on which the focus was placed is not blurred, and the region on which the focus was placed is used as the subject region. On the other hand, when the region on which the focus was placed contains a movement blur as illustrated in FIG. 9B, the image is judged to be a blurred image, and the region on which the focus was placed is not used as the subject region.

When the image contains a definite subject and the background is a long distance away from the subject, increasing the depth of field may not avoid the background from blurring.

On the other hand, separately evaluating the subject region and the background region as described above enables evaluation of such image without causing the user to have an unusual impression. Calculating the evaluation values of the subject region and the background region based on estimated depth of field DV using different standards (weighting coefficients) for different images enables evaluation of images considering the user's intention, the individual states of the images, major points in the images such as subject region.

Further, when the depth of field is small, evaluating only the subject region enables appropriate evaluation as to whether the area where no out-of-focus blur is desirable was shot without blur.

Next, the image processing device according to a fourth aspect of the invention will be described.

Figure 10:
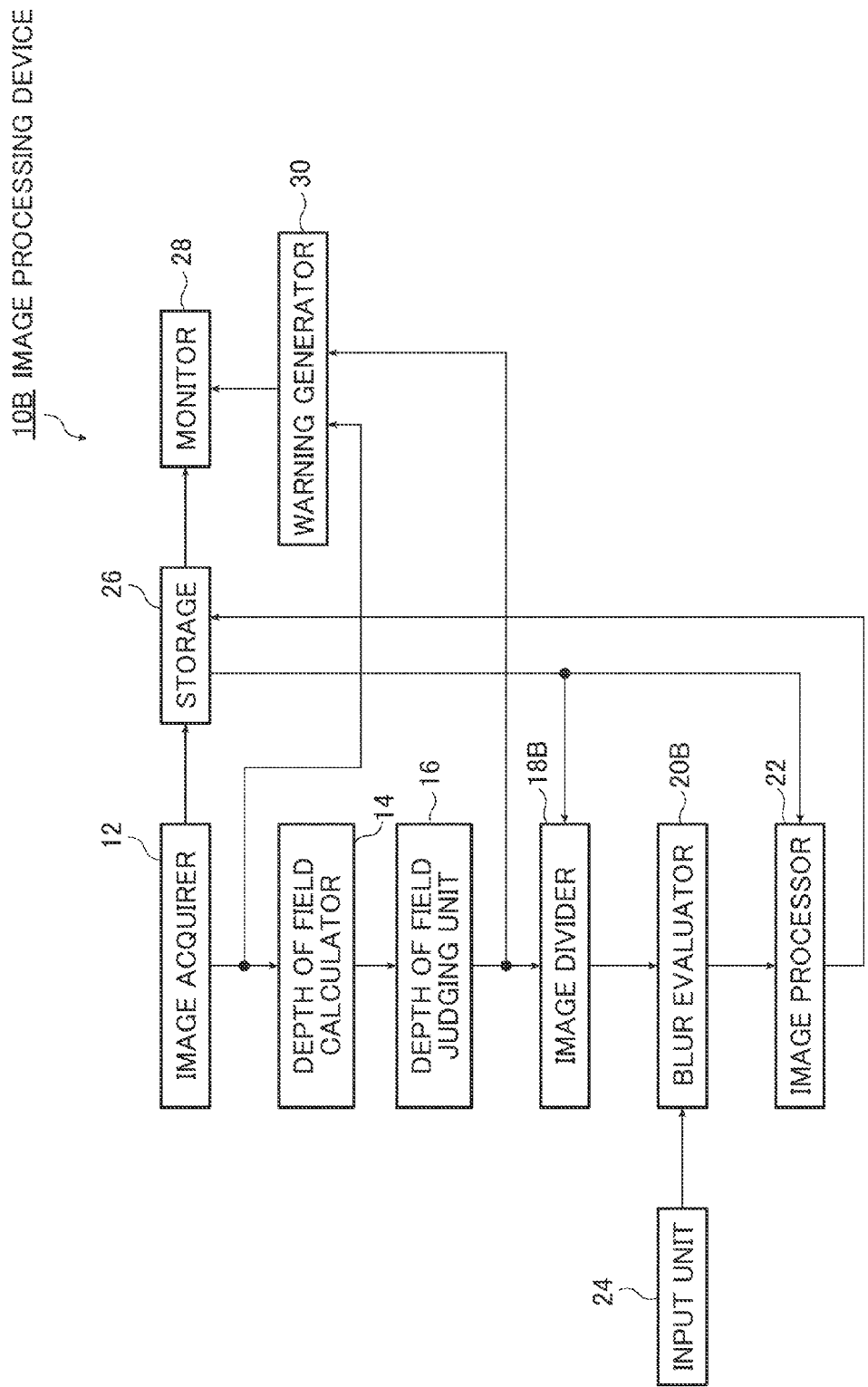
FIG. 10 is a block diagram illustrating the concept of a configuration of an embodiment of the image processing device according to a fourth aspect of the invention.

FIG. 10 is a block diagram illustrating the concept of a configuration of an embodiment of the image processing device according to the fourth aspect of the invention. An image processing device 10B shown in that drawing judges whether an image containing a blur is a successful image where the blur is intentionally caused by a user or a failed image and comprises an image acquirer 12, a depth of field calculator 14, a depth of field judging unit 16, an image divider 18B, a blur evaluator 20B, an image processor 22, an input unit 24, a storage 26, a monitor 28, and a warning generator 30.

The image acquirer 12, the depth of field calculator 14, the image processor 22, the storage 26, and the monitor 28 are identical to the counterparts in the image processing device 10A according to the first aspect and therefore the same description is not repeated here.

The depth of field judging unit 16 judges whether the depth of field of the image is smaller or greater than a reference depth based on the estimated depth of field DV calculated by the depth of field calculator 14. The depth of field judging unit 16 compares the estimated depth of field DV and a threshold Dt, and, when the estimated depth of field DV is smaller than the threshold Dt (DV<Dt), judges that the depth of field is greater than a given reference depth corresponding to the threshold Dt, whereas when, conversely, DV is greater than Dt (DV>Dt), the depth of field judging unit 16 judges that the depth of field is smaller than the given reference depth.

The reference depth is a depth of field serving as a reference for judging whether an image containing a blur is a successful image where the blur is intentionally caused by the user or a failed image.

Since, when the depth of field is greater than the reference depth (which is expressed simply as "the depth of field is great" in the following description), the whole area is substantially in focus in almost any scene, and the degree to which the background is out of focus is small, so that a blur observed in the image was highly likely caused by subject/camera movement or incorrect focusing. When, on the other hand, the depth of field is smaller than the reference depth (which is expressed simply as "the depth of field is small" in the following description), the range where the image is in focus is small, so that a blur detected in the image is likely a blur intentionally caused by the user using a shooting mode for defocusing the background.

The image processing device 10B uses these characteristics to estimate the user's intention from information on the depth of field used at the time of shooting (estimated depth of field DV) in order to enable evaluation of a blur in an image from the user's viewpoint.

Next, the image divider 18B extracts a specific region from the image acquired by the image acquirer 12. The image divider 18B divides the image into, for example, the subject region and one or more regions other than the subject region and extracts only the subject region or the individual, divided regions as specific regions. The image divider 18B divides the image into a plurality of regions such as 4, 9, and 16 regions and extracts the individual, divided regions as specific regions.

When the subject region is extracted from the image as specific region, the subject may be a person or any other object than a person such as, for example, animal, plant, automobile, or building.

The blur evaluator 20B performs one of the following processing (A), (B), and (C) when the depth of field judging unit 16 judges that the depth of field of the image is small.
(A) No blur evaluation for detecting a blur in the image and calculating the evaluation value for evaluating the degree of the blur in the image.
(B) Blur evaluation for a specific region extracted from the image to calculate the evaluation value of the image from the evaluation values of the specific regions. The evaluation value is determined according to the degree of blur in the image. According to this embodiment, the evaluation value is in a range of 0 to 1. The evaluation value is close to 0 when the degree of blur is relatively great and close to 1 when the degree of blur is relatively small.
(C) Reception of the evaluation value entered by the user.

When the depth of field is small, the image containing a blur is likely a successful image where the blur is intentionally caused by the user. In this case, the blur evaluator 20B performs one of the processing (A), (B), and (C) above and gives an evaluation value close to 1, for example, a value greater than 0.5, which is the middle value of 0 to 1.

When the depth of field judging unit 16 judges that the depth of field of the image is great, the blur evaluator 20B performs the above blur evaluation of the image to calculate the evaluation value of the image.

When the depth of field of the image is great, the image containing a blur is likely a failed image. In this case, the blur evaluator 20B gives the image an evaluation value close to 0, for example, a value smaller than 0.5.

When the image is judged to have a great depth of field, and when the shooting mode contained in the collateral information is a shooting mode for causing a blur in the background of the image, one of the processing (A), (B), and (C) may be performed.

The blur evaluator 20B judges whether the image (region) is a blurred image (blurred region) based on the evaluation value. The blur evaluator 20B judges the image to be a blurred image when the evaluation value is smaller than a given reference value, for example, 0.3.

The input unit 24 is provided for the user to enter the evaluation value of the image when, for example, the depth of field judging unit 16 judges that the image has a small depth of field. The input unit 24 may be, for example, an input device such as keyboard, mouse, and touch panel, for operating the GUI (Graphical User Interface) displayed on the monitor 28 to enter the evaluation value.

The warning generator 30 gives a warning to alert the user to the possibility that the image may be a failed image containing a camera-movement blur or an out-of-focus blur when the depth of field judging unit 16 judges that the image has a small depth of field and when the shutter speed contained in the collateral information to the image is slower than a given value, for example, the reciprocal of the focal length in a 35-mm film equivalent. While the warning generator 30 according to this embodiment allows a warning message to be displayed on the monitor 28, the warning may be a sound warning.

Figure 11:
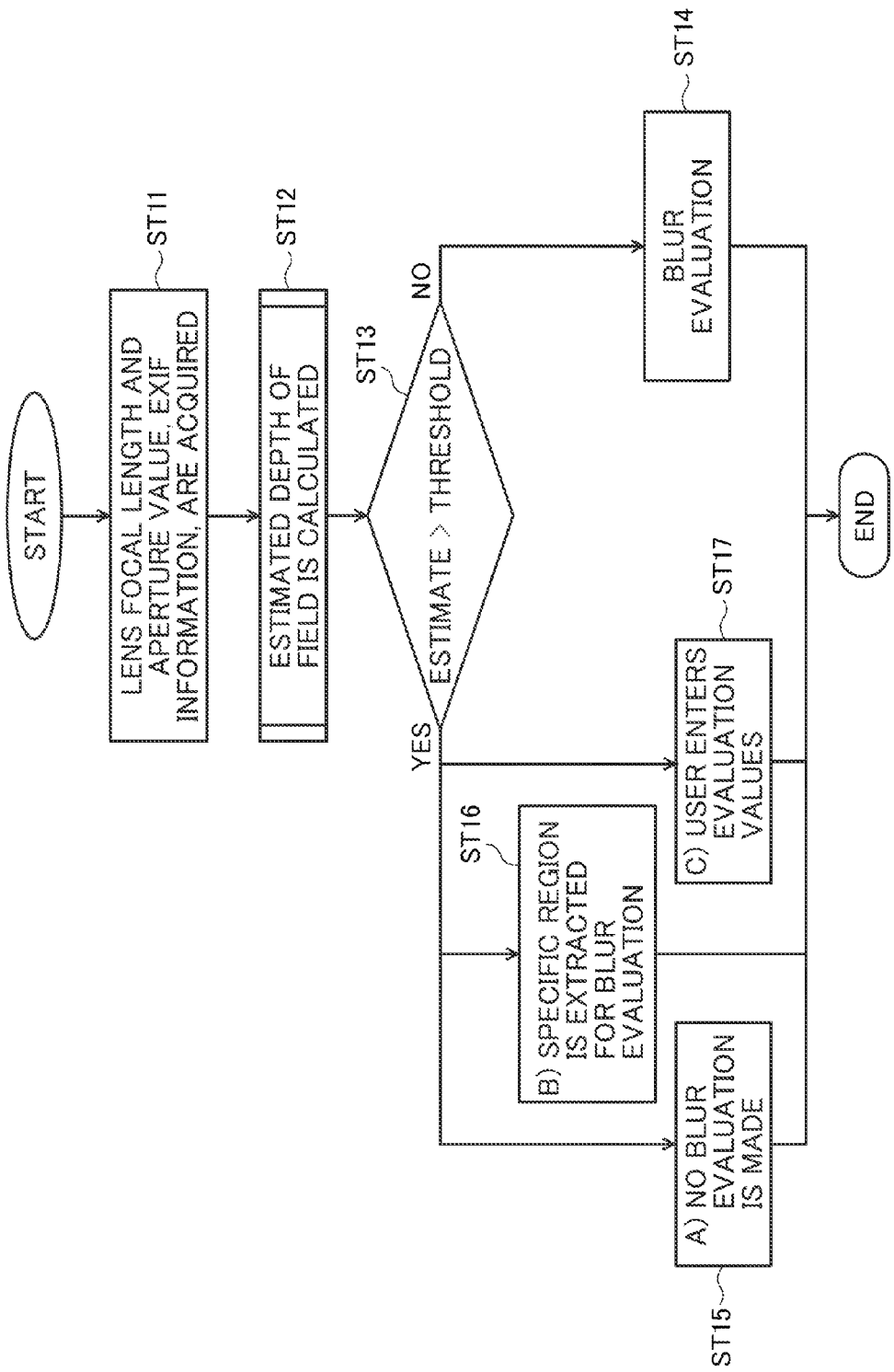
FIG. 11 is a flowchart of a first example representing the operation of the image processing device shown in FIG. 10.

Next, the operation of the image processing device 10B where the image is evaluated by the image processing method according to a fifth aspect of the invention is described with reference to the flowchart illustrated in FIG. 11.

The operations performed in steps ST11 to ST12 in the image processing device 10B are the same as ST1 to ST2 in the image processing device 10A.

Next, the depth of field judging unit 16 compares the estimated depth of field DV calculated by the depth of field calculator 14 and the threshold Dt and judges whether the depth of field of the image is smaller or greater than the reference depth in step ST13.

When the estimated depth of field DV is judged to be smaller than the threshold Dt, that is, when the depth of field of the image is judged to be great (NO in step ST13), the blur evaluator 20B performs the blur evaluation to determine the evaluation value of the image in step ST14. When the depth of field is judged to be great, the image is likely a failed image and is therefore given an evaluation value smaller than 0.5.

On the other hand, when the estimated depth of field DV is judged to be greater than the threshold Dt, that is, when the image is judged to have a small depth of field (YES in step ST13), the blur evaluator 20B performs one of the processing: (A) where no blur evaluation is performed in step ST15; (B) where a specific region is extracted to perform blur evaluation in step ST16; and (C) where the user enters the evaluation value in step ST17.

The image processing device 10B, using collateral information on the image, estimates the user's intention to correctly judge whether an image containing a blur is a successful image where the blur is intentionally caused by the user or a failed image.

Described below is a case where the processing (A) to (C) are performed.

Figure 12:
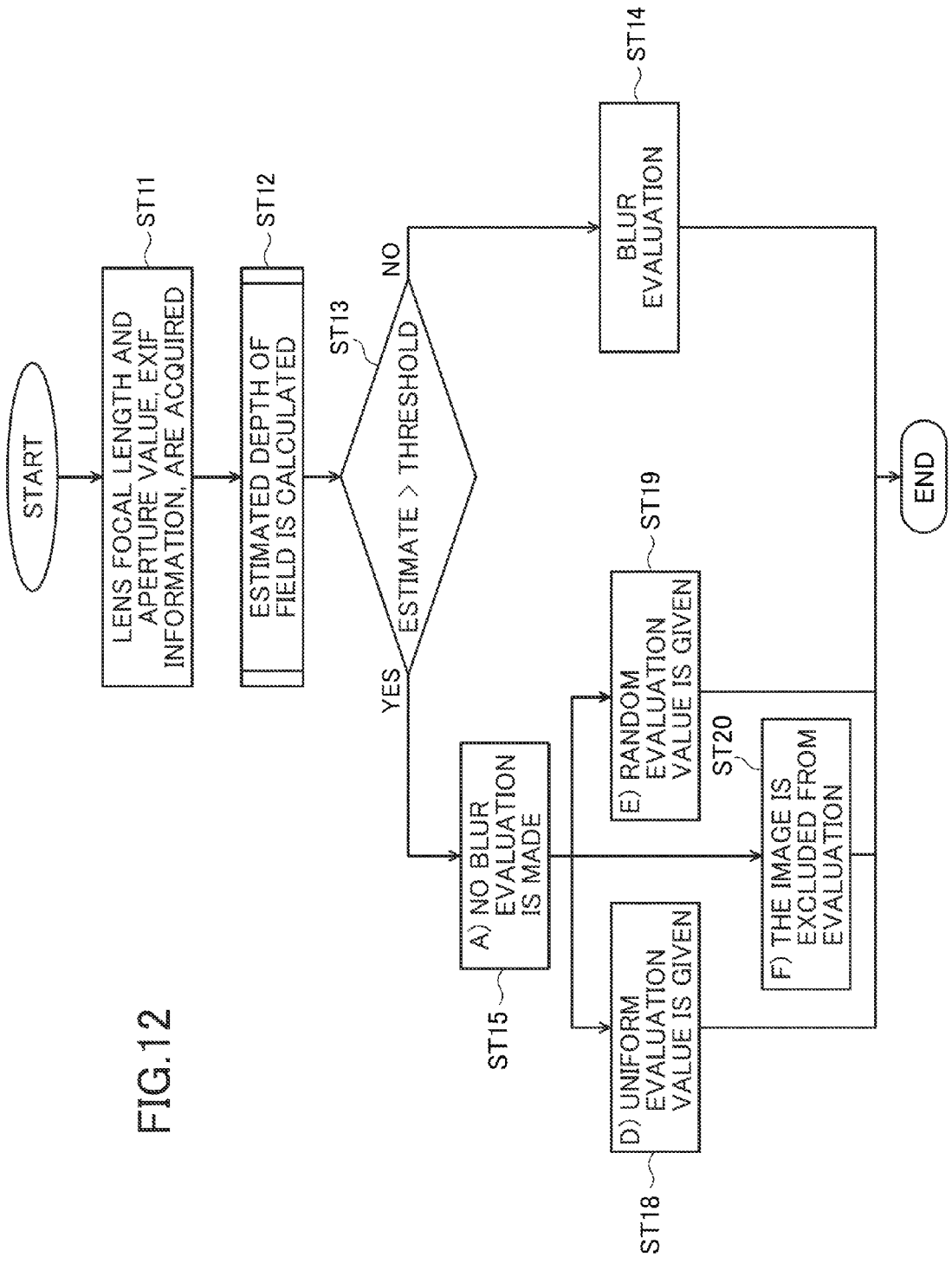
FIG. 12 is a flowchart of a second example representing the operation of the image processing device shown in FIG. 10.

First, the processing (A) is described with reference to the flowchart of FIG. 12.

In the processing (A), the blur evaluator 20B performs one of the following processing (D) to (F).

(D) Giving the image a specified, uniform evaluation value, which is, for example, 0.7 in this embodiment, defined as evaluation of an image of which the background is defocused in step ST18.
(E) Giving the image a random evaluation value larger than a threshold BOt, which is, for example, 0.5 in this embodiment in step ST19.
(F) Excluding the image from evaluation in step ST20.

When the depth of field is judged to be small (YES in step ST13), the image is likely a successful image where the blur is intentionally caused by the user and therefore given an evaluation value larger than 0.5.

Like processing is therefore repeated for a plurality of images. Upon completion of the processing for a given number of images, the image processor 22 arranges the images, for example, in descending order of evaluation value whereupon the images are displayed on the monitor 28.

Alternatively, the image processor 22 may ensure that an indication is displayed to show whether each image is a blurred image based on a threshold BLt. The threshold BLt in this case is equal to or lower than the above threshold BOt. Thus, in this embodiment, the threshold BLt is smaller than 0.5. When, for example, the evaluation value is smaller than 0.3, an indication is shown that the image is a blurred image.

Likewise, a successful image having, for example, a blur in the background intentionally caused by the user is saved unfavorable evaluation, and an appropriate evaluation can be made, appropriately assisting the user in preferentially selecting successful images, not blurred images, from among a large number of images.

Figure 13:
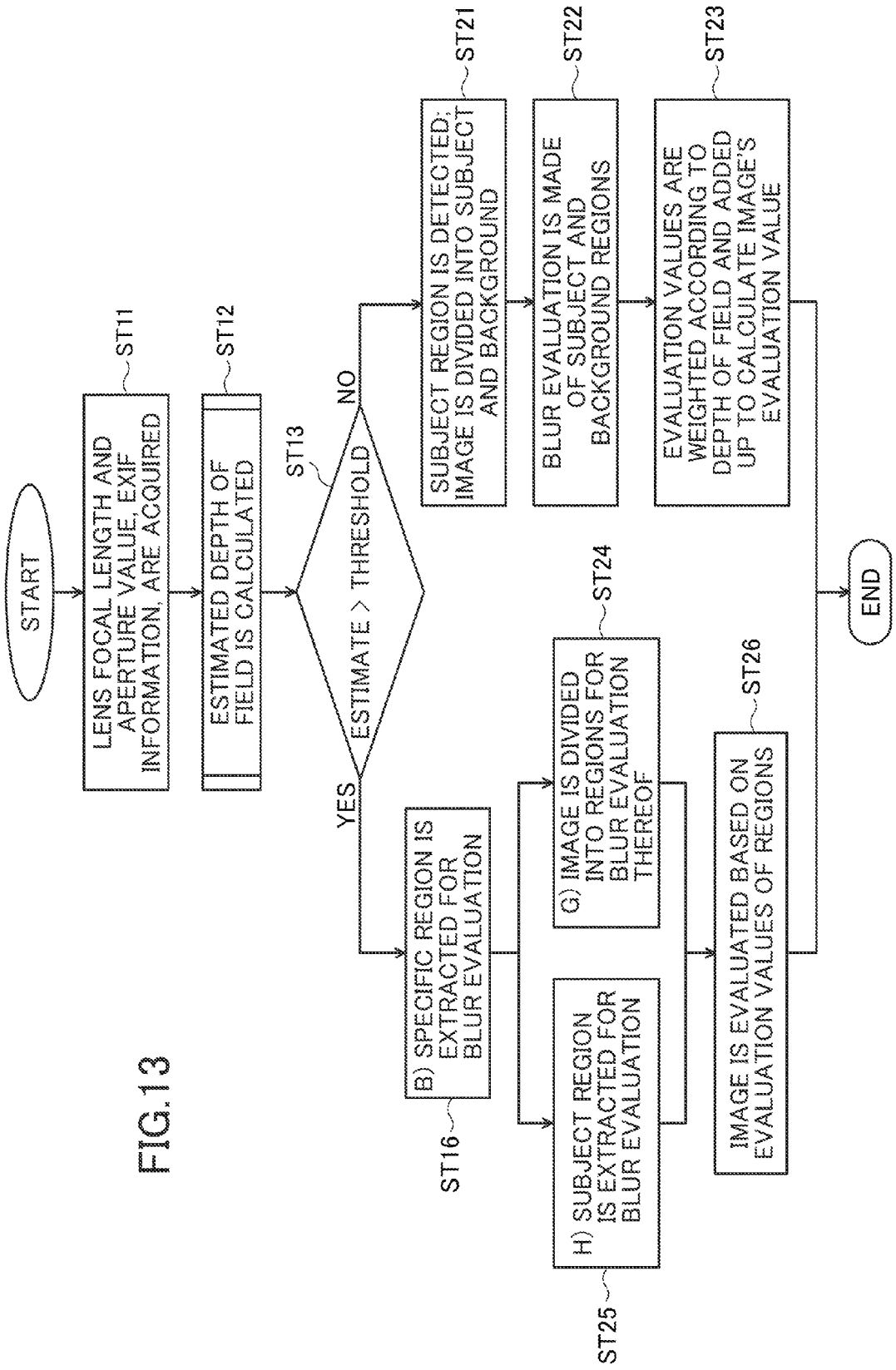
FIG. 13 is a flowchart of a third example representing the operation of the image processing device shown in FIG. 10.

Next, the processing (B) is described with reference to the flowchart of FIG. 13.

In the processing (B), the processing (G) or (H) is performed.
(G) Dividing the image into evaluation regions with the image divider 18B, performing blur evaluation of the individual evaluation regions to calculate the evaluation values of the individual regions with the blur evaluator 20B, and calculating the evaluation value of the image from the evaluation values of the individual regions based on the estimated depth of field DV in step ST24.
(H) Dividing the image into the subject region and one or more regions other than the subject region with the image divider 18B and adding up the evaluation value of the subject region and the evaluation value of the one or more regions with weights added based on the estimated depth of field DV with the blur evaluator 20B in step ST25.

In the processing (G) is determined firstly the number of allowable blurred regions representing the maximum number of evaluation regions judged to be blurred regions (failed regions) with which the image is still not judged to be a blurred image (failed image) based on the estimated depth of field DV.

The operations performed thereafter through steps ST14 to ST16 are the same as the operations through ST5 to ST7 in the image processing device 10A.

Even where the depth of field is small, detecting whether the image is a blurred image is made possible by dividing the image into regions and evaluating the individual regions Further, an evaluation value corresponding to the depth of field of the image can be given. Still further, the evaluation values of the evaluation regions are yielded based on the estimated depth of field DV using different standards for different images (number of allowable blurred regions), enabling evaluation considering the user's intention and the states of the individual images.

When, in the processing (H), the depth of field judging unit 16 judges that the image has a great depth of field, the image is divided into the subject region and one or more regions other than the subject region to perform blur evaluation of the individual regions, yielding the evaluation values.

The operations performed thereafter through steps ST21 to ST23 are the same as the operations through ST8 to ST10 performed in the image processing device 10A.

When, in the processing (H), the depth of field judging unit 16 judges that the image has a small depth of field, the image divider 18B extracts only the subject region from the image, the blur evaluator 20B performs blur evaluation only of the extracted subject region to calculate the evaluation value in step ST25, so that the evaluation value of the subject region may be used as the evaluation value of the image in step ST26.

Figure 14:
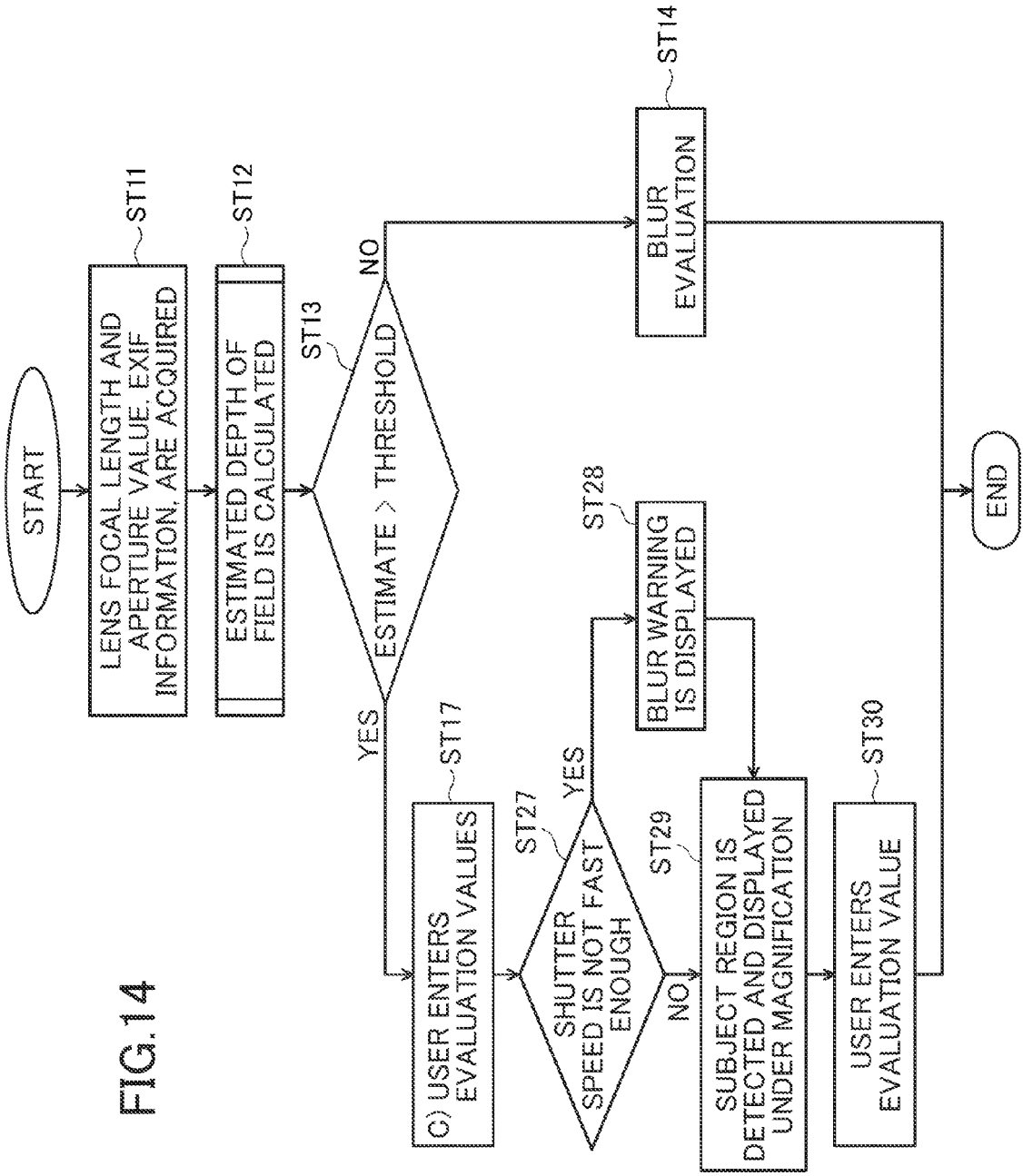
FIG. 14 is a flowchart of a fourth example representing the operation of the image processing device shown in FIG. 10.

Next, the processing (C) is described with reference to the flowchart of FIG. 14.

In the processing (C), verification is first made as to whether the shutter speed, used at the time of shooting and contained in the collateral information to the image, is sufficiently fast in step ST27.

When the shutter speed used at the time of shooting is slower than a given speed (YES in step ST27), the warning generator 30 causes the monitor 28 to display a warning message such as "BEWARE OF POOR FOCUS!" and "BEWARE OF CAMERA SHAKE!" as illustrated in FIG. 15A in step ST28. Thus, the user is alerted to the possibility that the image may be a failed image containing, for example, a camera movement-caused blur and/or an out-of-focus blur.

When, on the other hand, the shutter speed is faster than a given speed (NO in step ST27), the image divider 18B extracts the subject region from the image, and the image processor 22 causes the monitor 28 to display the extracted subject region enlarged in step ST29. Thus, the user, viewing the image displayed under magnification, can readily evaluate the blur contained in the image.

Next, the user, viewing the subject region displayed under magnification as illustrated in FIGS. 15B and 15C, verifies whether the subject region contains a blur and enters an evaluation value of the image via the input unit 24 in step ST30.

Thus, as the very user who intentionally caused a blur in the image evaluates the image, evaluation of the image better representing the user's intention can be made. As regards the other failed images, the amount of work the user must perform can be reduced.

The present invention may be applied not only to evaluation of a blur in an image already shot by the user, but to evaluation of a blur to be made as the user shoots an image, i.e., before the user shoots an image.

The image processing method of the invention can be realized as an image processing program for causing a computer to execute each step of the image processing method. The image processing method may be realized as a computer readable recording medium having the image processing program recorded thereon.

This invention is basically as described above.

While the present invention has been described above in detail, the invention is not limited to the above embodiments, and various improvements and modifications may be made without departing from the spirit and scope of the invention.

What is claimed is:

1. An image processing device comprising:
   a camera implemented by a programmed computer and configured to acquire an image;
   a depth of field calculator implemented by the programmed computer and configured to calculate an estimate representing a depth of field of the image based on collateral information of the image acquired by the camera, an image divider implemented by the programmed computer and configured to divide the image into evaluation regions, and a blur evaluator implemented by the programmed computer and configured to detect an out-of-focus blur or a movement-caused blur in each of the evaluation regions divided by the image divider, perform blur evaluation for calculating evaluation values for evaluating a degree of the out-of-focus blur or the movement-caused blur, and calculate an evaluation value of the image from the evaluation values of the evaluation regions so that the evaluation value increases as the depth of field decreases based on the estimated depth of field, the evaluation value being in a range of 0-1 and that the evaluation value is close to 0 when the degree of blur is relatively large and close to 1 when the degree of blur is relatively small.

2. The image processing device according to claim 1,
wherein the blur evaluator is adapted to
increase a number of allowable blurred regions representing a maximum number of evaluation regions judged to be blurred regions with which the image is not judged to be a blurred image as the depth of field decreases based on the estimated depth of field;
perform the blur evaluation of the evaluation regions divided by the image divider to calculate the evaluation values of the evaluation regions; and
add up the evaluation values of a number of evaluation regions equal to "a total number of evaluation regions minus the number of allowable blurred regions", obtain an average thereof, the evaluation regions for such addition being selected in order of decreasing evaluation values, and calculate the evaluation value of the image.

3. The image processing device according to claim 2, wherein
the blur evaluator is adapted to judge whether the evaluation regions are the blurred regions based on the evaluation values of the evaluation regions and,
when a number of evaluation regions judged to be the blurred regions exceed the number of allowable blurred regions, judge the image to be the blurred image.

4. The image processing device according to claim 1,
wherein the image divider is adapted to divide the image into a subject region and one or more regions other than the subject region as the evaluation regions,
wherein the blur evaluator is adapted to perform the blur evaluation of the subject region and the one or more regions other than the subject region to calculate evaluation values, increase a weight for the subject region more than a weight for the one or more regions other than the subject region as the depth of field decreases based on the estimated depth of field, and weight and add up the evaluation values of the subject region and the one or more regions other than the subject region to calculate an evaluation value of the image.

5. The image processing device according to claim 4,
wherein, when the image is divided into the subject region and two or more regions other than the subject region, the blur evaluator is adapted to reduce weights of the two or more regions other than the subject region according to a distance from the subject region.

6. The image processing device according to claim 4,
wherein the image divider is adapted to use one of face detection, human detection, pet detection, and focusing area detection to extract the subject region from the image.

7. The image processing device according to claim 4,
wherein the image divider is adapted to determine a region corresponding to a focusing point on which a focus is placed in autofocus as the subject region.

8. The image processing device according to claim 1,
wherein the depth of field calculator is adapted to use an aperture value acquired as the collateral information when the image is shot as the estimated depth of field.

9. The image processing device according to claim 1,
wherein the depth of field calculator is adapted to use a lens' focal length and an aperture value acquired as the collateral information when the image is shot to calculate the estimated depth of field from the lens' focal length divided by the aperture value.

10. The image processing device according to claim 8,
wherein the depth of field calculator is adapted to use a distance between a camera and a subject acquired as the collateral information when the image is shot to make an adjustment such that as the distance decreases, the estimated depth of field increases.

11. The image processing device according to claim 1,
wherein when the blur evaluator calculates the evaluation value of the image, the blur evaluator is adapted to make an adjustment such that as the aperture value decreases, the evaluation value of the image increases, according to the aperture value when the image is shot and contained in the collateral information.

12. The image processing device according to claim 1,
further comprising an image processor implemented by the programmed computer and configured to rearrange a plurality of images based on evaluation values of the plurality of the images.

13. The image processing device according to claim 3,
further comprising an image processor implemented by the programmed computer and configured to perform correction for reducing an out-of-focus blur or a movement-caused blur in the image based on the evaluation value when the blur evaluator judges the image to be the blurred image.

14. An image processing method comprising:
an image acquiring step of acquiring an image with a camera;
a depth of field calculating step of calculating an estimate representing a depth of field of the image based on collateral information of the image acquired in the image acquiring step;
an image dividing step of dividing the image into evaluation regions; and
a blur evaluating step of detecting an out-of-focus blur or a movement-caused blur in each of the evaluation regions divided in the image dividing step to perform blur evaluation for calculating evaluation values for evaluating a degree of the out-of-focus blur or the movement-caused blur and calculating an evaluation value of the image from the evaluation values of the evaluation regions so that the evaluation value increases as the depth of field decreases based on the estimated depth of field, the evaluation value being in a range of 0-1 and that the evaluation value is close to 0 when the degree of blur is relatively large and close to 1 when the degree of blur is relatively small.

15. A non-transitory computer readable recording medium having recorded thereon an image processing program for causing a computer to execute each step of the image processing method according to claim 14.

16. The image processing method according to claim 14, wherein the blur evaluator performs:

increasing a number of allowable blurred regions representing a maximum number of evaluation regions judged to be blurred regions with which the image is not judged to be a blurred image as the depth of field decreases based on the estimated depth of field;

blur evaluating of the evaluation regions divided by the image divider to calculate the evaluation values of the evaluation regions; and adding up the evaluation values of a number of evaluation regions equal to "a total number of evaluation regions minus the number of allowable blurred regions", obtain an average thereof, the evaluation regions for such addition being selected in order of decreasing evaluation values, and calculate the evaluation value of the image.

17. The image processing method according to claim 16, wherein the blur evaluator performs:

judging whether the evaluation regions are the blurred regions based on the evaluation values of the evaluation regions and, when a number of evaluation regions judged to be the blurred regions exceed the number of allowable blurred regions, judge the image to be the blurred image.

18. The image processing method according to claim 16, wherein the image divider performs:

dividing the image into a subject region and one or more regions other than the subject region as the evaluation regions, wherein the blur evaluator performs the blur evaluation of the subject region and the one or more regions other than the subject region to calculate evaluation values, increases a weight for the subject region more than a weight for the one or more regions other than the subject region as the depth of field decreases based on the estimated depth of field, and weight and add up the evaluation values of the subject region and the one or more regions other than the subject region to calculate an evaluation value of the image.

19. The image processing method according to claim 18, further comprising:

dividing the image into the subject region and two or more regions other than the subject region, and the blur evaluator reduces weights of the two or more regions other than the subject region according to a distance from the subject region.

20. The image processing method according to claim 18, wherein the image divider uses one of face detection, human detection, pet detection, or focusing area detection to extract the subject region from the image.

21. The image processing device according to claim 1, wherein the image processing device judges whether the image is a blurred image based on the evaluation value.

22. The image processing method according to claim 14, further comprising judging whether the image is a blurred imaged based on the evaluation value.

* * * * *